United States Patent [19]
Nojiri et al.

[11] Patent Number: 4,971,177
[45] Date of Patent: Nov. 20, 1990

[54] DATA GATHERING SYSTEM HOUSING/MOUNTING

[75] Inventors: Howard H. Nojiri, Eugene; Eric L. Brandenburg, Leaburg, both of Oreg.; Nigel G. Mills, Worthington; James F. Million, Powell, both of Ohio; Louis J. Guzzo, Jr., Inman, S.C.

[73] Assignee: Spectra-Physics, Inc., San Jose, Calif.

[21] Appl. No.: 328,461

[22] Filed: Mar. 24, 1989

[51] Int. Cl.⁵ .................. A47F 9/04; G01G 21/28; G06K 7/10
[52] U.S. Cl. .................................... 186/61; 177/245; 235/383
[58] Field of Search ................ 186/61; 235/383, 462; 364/405, 567; 177/1, 50, 245

[56] References Cited
U.S. PATENT DOCUMENTS 4,700,656 10/1987 Cone et al. ............... 235/462 X
4,879,650 11/1989 Kurimoto et al. ............ 364/405
4,881,606 11/1989 Halfon et al. ............... 177/126

Primary Examiner—F. J. Bartuska
Attorney, Agent, or Firm—Killworth, Gottman, Hagan & Schaeff

[57] ABSTRACT

Housing/mounting apparatus for a data gathering system inserted into a checkout counter and including a weighing scale and an optical scanner supported thereon for scanning bar code labels and defining an upper weighing surface of the scale comprises a base supported within the checkout counter for supporting the data gathering system with the scale being secured to the base. A perimeter enclosure is secured to the base and houses the optical scanner. The scale includes a spider load receiving plate supported within the perimeter enclosure through an aperture in its floor. Locator pins and corresponding holes stably position the optical scanner on the scale load receiving plate and the optical scanner thus positioned is sized such that clearance gaps required for proper operation of the weighing scale are defined between the optical scanner and the perimeter enclosure. Leveling and fastener or clamping devices are incorporated into the base to facilitate installation and maintenance of the system. By incorporating these devices into the mounting base, the system can be positioned, leveled and secured in place after the base is installed in a checkout counter to eliminate iterative operations. Scanner height adjustments are performed and limits on scale travel are defined by devices incorporated onto the weighing platter adding further to the versatility and ease of installation/maintenance of a data gathering system incorporating the housing/mounting apparatus.

16 Claims, 10 Drawing Sheets

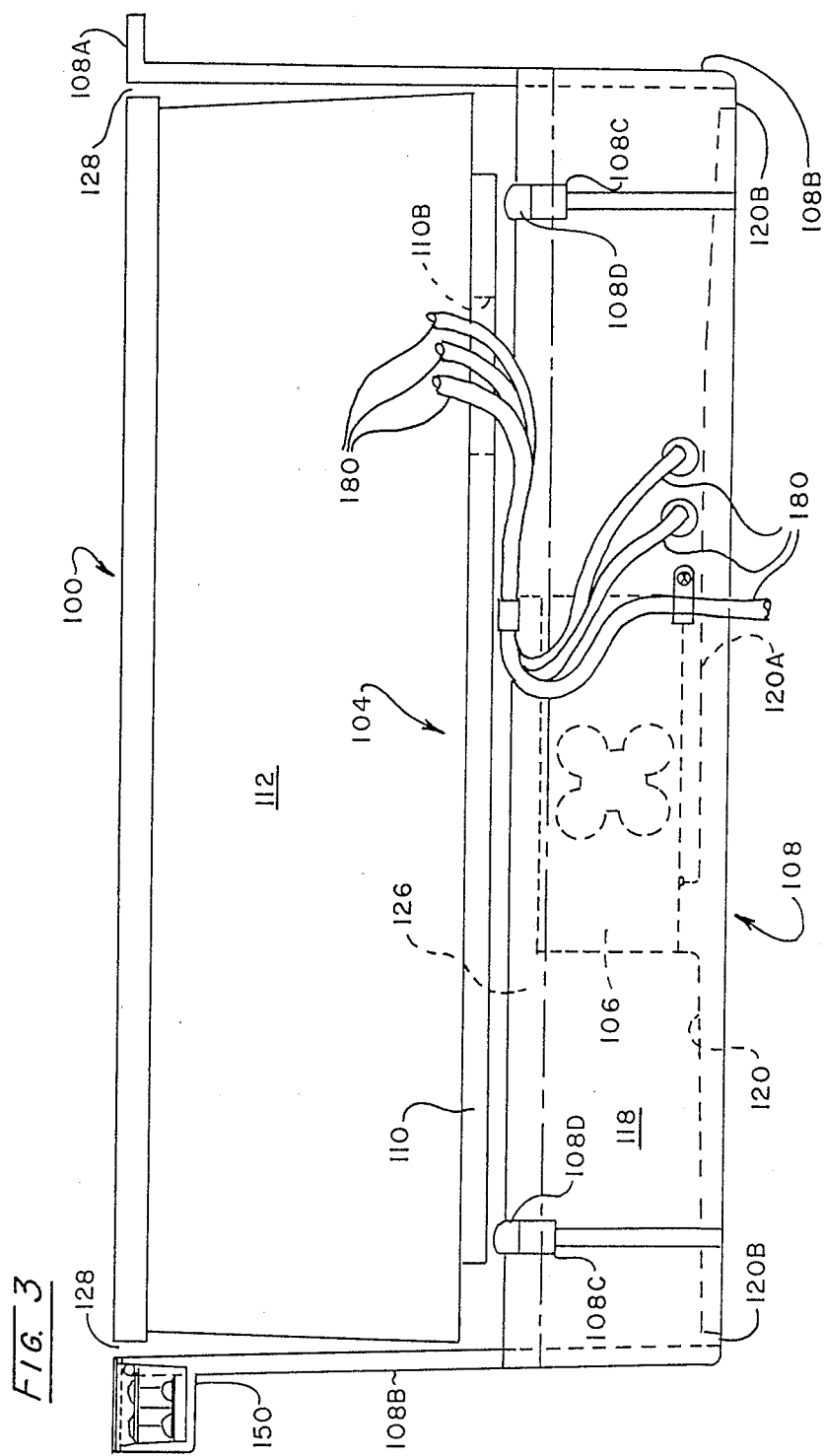

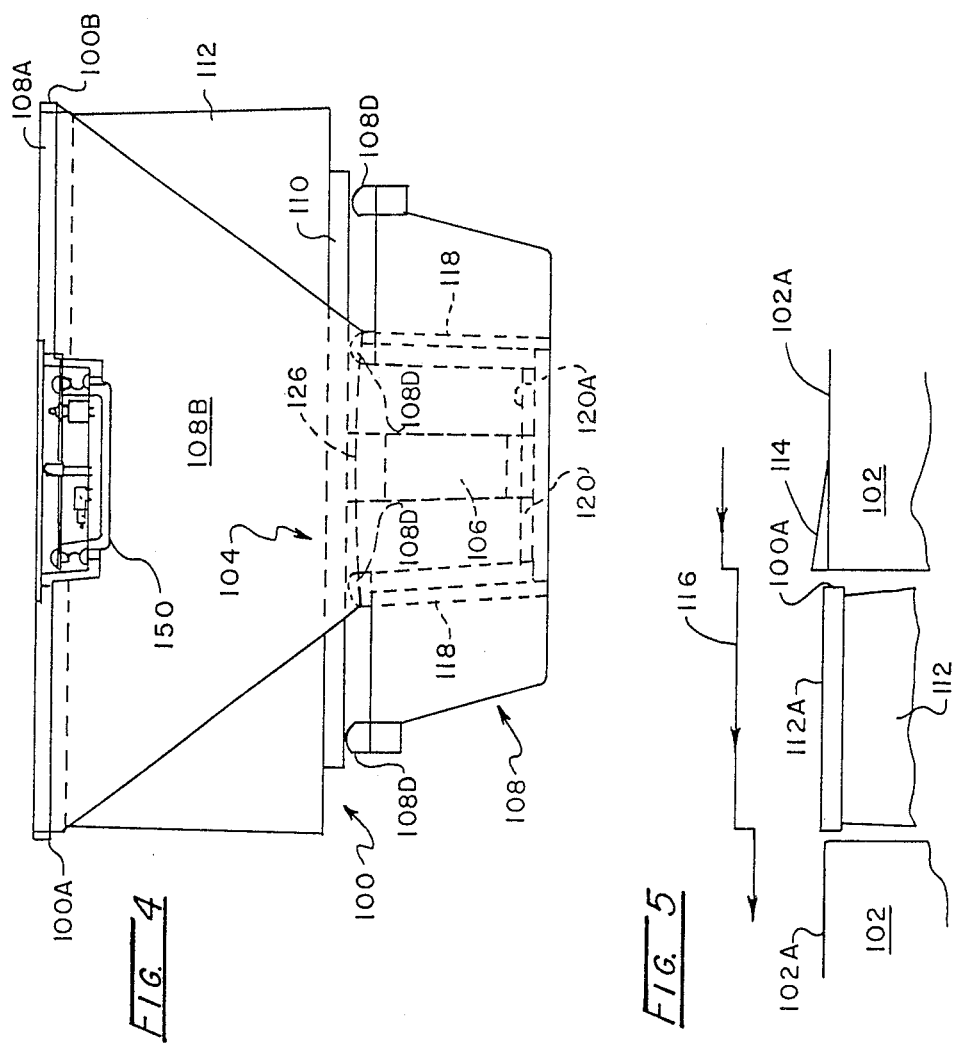

DATA GATHERING SYSTEM HOUSING/MOUNTING

CROSS REFERENCE TO RELATED APPLICATIONS

The present application is related to the following U.S. Pat. applications which were filed on even date herewith: Data Gathering System Including Cradle Suspension, Ser. No. 328,178; Method and Apparatus for Mounting Data Gathering System, Ser. No. 328,229; Spill Control Mounting for Data Gathering System, Ser. No. 328,230; Scale Calibration/Zeroing in Data Gathering System, Ser. No. 328,188; Point-of-Sale Data Gathering System, Ser. No. 328,272.

BACKGROUND OF THE INVENTION

The present invention relates generally to data gathering systems including combined weighing scales and optical scanners supported upon the scales and, more particularly, to apparatus for housing and mounting such a data gathering system to facilitate installation and maintenance of the system and to better ensure extended reliable operation of the system.

Supermarket checkout counters commonly include optical scanners mounted therein for optically scanning bar code labels on products to be purchases as the products are moved over scanning windows in the top surfaces of the scanners. The scanners read and convert the bar code labels into product identification and pricing information which is used for the sale and other merchandising purposes, such as inventory control. Since many products sold in supermarkets, for example produce, are sold by weight, oftentimes weighing scales are also positioned adjacent the checkout counters. The weighing scales can be manually operable such that sales clerks weigh products and then enter the corresponding prices on associated registers. Alternately, the weighing scales can be partially or fully automated such that the weights and resulting price information are directly passed to the registers.

One example of an automated data gathering system is disclosed in U.S. Pat. No. 4,656,344, wherein a scale and an optical scanner are not only directly interconnected to an associated register but also are integrated into a single unit which fits within the checkout counter. While this integrated scale/scanner system offers advantages over the prior separated component systems in terms of convenience and space savings, still there are disadvantages and inconveniences associated with the integrated system. For example, the system does not provide a defined clearance between the load bearing top surface of the system which defines the weighing platter for the scale and the counter into which the system is installed. For this system the clearance is determined by the manufacturer of the checkout counter and/or the installer with the materials and installation tools commonly used providing tolerance variations which are on the order of the required clearances. Under these circumstances, the weighing platter may engage the counter resulting in inaccurate weight indications.

Further, if the system is not sufficiently level when installed into a counter, shims or other leveling techniques must be applied. Typically, such leveling techniques require an iterative process such that the system must be repetitively removed and reinstalled until satisfactorily level. These procedures are time consuming and may be physically difficult, particularly for integral units which tend to be heavy.

Accordingly, there is a need for improved apparatus for housing and mounting a data gathering system to facilitate installation and maintenance of the system and to better ensure reliable operation of the system over extended periods of time. Such housing and mounting apparatus preferably would define and maintain required clearances between movable portions of the scale and the counter into which it is installed and would prevent horizontal translation of portions of the system which can be caused by normal use of the system.

SUMMARY OF THE INVENTION

This need is met by the data gathering system housing/mounting apparatus of the present invention wherein a perimeter enclosure is supported upon a mounting base to house an optical scanner which defines an upper weighing surface, i.e. the weighing platter, of a scale of the system. The scale is secured to the base and defines a spider load receiving plate extending into the perimeter enclosure for receiving and positioning the optical scanner. The perimeter enclosure in cooperation with the positioning of the scanner/weighing platter defines scale clearance gaps required for proper operation of the scale of the data gathering system. Since the clearance gaps are defined by the system, checkout counter manufacturers and installers are able to use standard materials and tools which are currently used to install data gathering systems which only include an optical scanner. Leveling and fastener or clamping devices are advantageously incorporated into the mounting base to facilitate installation and maintenance of the system. By incorporating these devices into the mounting base, the system can be positioned, leveled and secured in place after the base is installed in a checkout counter to eliminate any iterative operations. Scanner height adjustments are performed and limits on scale travel are defined by devices incorporated into the spider load receiving plate adding further to the versatility and ease of installation/maintenance of a data gathering system incorporating the housing/mounting apparatus.

In accordance with one aspect of the present invention, mounting apparatus for a data gathering system inserted into a checkout counter and including a weighing scale and an optical scanner supported thereon for scanning bar code labels and defining an upper weighing surface of the scale comprises base means supported within the checkout counter for supporting the data gathering system, the scale being secured to the base means. Perimeter enclosure means are secured to the base means and define a floor and sidewalls for housing the optical scanner. The scale includes a load receiving plate supported within the perimeter enclosure means through an aperture in its floor. Locator means stably position the optical scanner on the scale load receiving plate and the optical scanner is positioned by the locator means and sized such that clearance gaps required for proper operation of the weighing scale are defined between the optical scanner and the perimeter enclosure means.

The base means preferably comprises integral adjusting means for leveling the base means and the checkout counter includes sidewalls with the base means supported upon and secured to inward extension means projecting from the sidewalls. The integral adjusting means may comprise leveling screws threadedly engaging the base means as in the illustrative embodiment. The base means may also comprise fastener means which clamp or otherwise secure the system either partially or fully to the checkout counter. To facilitate assembly and reliable operation, strain relief means are provided on the base means and the scale load receiving plate to secure cables which connect electrical signals and power between the weighing scale and the optical scanner. Installation and maintenance of the data gathering system is further facilitated by providing guide means for routing the cables between the weighing scale and the optical scanner, with the guide means preferably being included on the scale load receiving plate.

The scale load receiving plate may comprise height adjustment means to selectively adjust the height of the optical scanner relative to the top edge of the perimeter enclosure means. Alternatively, the height adjustment means may be used to selectively adjust the height of the optical scanner relative to the top surface of the checkout counter independent of the vertical location of the top edge of the perimeter enclosure means. For example, the height adjustment means may comprise height adjustment bumpers threadedly engaging the weighing platter for supporting the optical scanner thereon as in the illustrative embodiment. The locator means may comprise at least two pins which are received in corresponding holes, the pins and holes being formed on the bottom of the optical scanner and the weighing platter. In this way, the locator means can properly function throughout the range of height adjustment. The locator means may further comprise scanner locating grommets sized to be received into the holes and in turn to receive the pins. Such locating grommets accommodate minor variations in hole/pin locations due to manufacturing tolerances and help ensure accurate positioning of the optical scanner within the system.

The scale load receiving plate may comprise overload adjustment means for selectively adjusting the maximum travel of the load receiving plate to thereby prevent potentially damaging scale overload. For example, the overload adjustment means may comprise overload adjustment screws threadedly engaging the load receiving plate and aligned for abutment with portions of the base means to define limits of travel for the load receiving plate/weighing platter/optical scanner. Preferably, the load receiving plate is formed as a spider to facilitate access to the base means prior to installation or after removal of the optical scanner from the data gathering system. The perimeter enclosure means can comprise spill control means for diverting any liquids spilled on the system away from the base casting and system components contained therein. In the preferred embodiments, the perimeter enclosure extends beyond the base casting on at least one side and includes an opening in that portion to invert liquids spilled on the system through the opening.

It is thus an object of the present invention to provide improved apparatus for housing and mounting a data gathering system including a weighing scale and associated optical scanner to facilitate installation and maintenance of the system and improve reliability; to provide improved apparatus for housing and mounting a data gathering system including a weighing scale and associated optical scanner wherein a perimeter enclosure in cooperation with optical scanner positioning means defines clearance gaps for the system to ensure proper vertical deflection of the scale for weight measurements; and, to provide improved apparatus for housing and mounting a data gathering system including a weighing scale and associated optical scanner wherein integral means are provided for leveling, clamping height position adjusting and/or overload/overtravel limiting components of the system.

Other objects and advantages of the invention will be apparent from the following description, the accompanying drawings and the appended claims.

BRIEF DESCRIPTION OF THE DRAWINGS

FIGS. 2-4 are top, side and end views, respectively, of the data gathering system of FIG. 1;

FIG. 5 is a schematic side view of the upper surface of a checkout counter including the data gathering system of the present invention and showing a trim strip for defining a preferred product flow path;

FIG. 9 is positioned above FIG. 10;

DETAILED DESCRIPTION OF THE INVENTION

Figure 1:
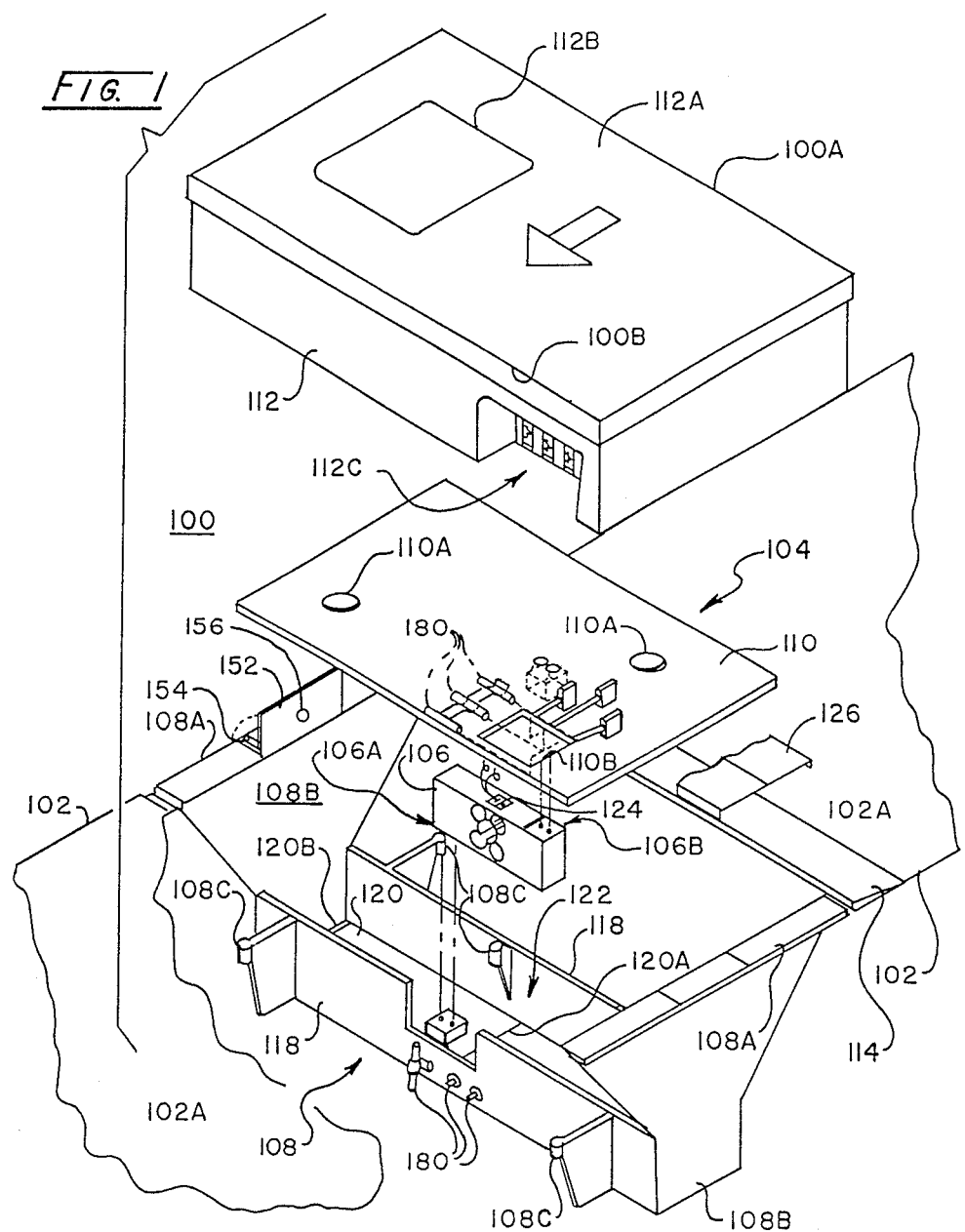
FIG. 1 is an exploded perspective view of a data gathering system in accordance with the present invention for use in a checkout counter.

The present invention is primarily directed to a data gathering system housing/mounting arrangement including a perimeter enclosure which facilitates proper spacing and mounting of the system within a checkout counter. However, to more clearly define the environment of the present invention, a related data gathering system which is freely suspending by a cradle support will also be described.

Reference is now made to the drawings which show a data gathering system 100 in accordance with the present invention which is designed for use in a point of sale checkout counter 102. The data gathering system 100 is designed to be fitted entirely within the counter 102 and is structured as two separate units which can be independently manufactured, tested, packaged and shipped and also individually handled and installed. By structuring the system as two separate units, it initially can be easily installed in the counter 102 and thereafter easily removed and reinstalled for system maintenance and repair. Further, the scanning operation can be more o easily and accurately performed since scanning light beams pass directly from the scanner as opposed to passage through secondary windows and/or apertures as in prior art systems wherein a scale platter is required above the top of the scanner. The data gathering system 100 conveniently provides for both reading bar-coded labels secured to products to be purchased and also weighing products which are placed upon the upper surface of the system.

The data gathering system 100 comprises scale means, taking the form of a load cell scale 104 in the embodiment illustrated in FIGS. 1–8 which is supported within the checkout counter 102 by support means and provides for determining weights of products presented to the data gathering system 100. The scale 104 comprises a cantilever beam load cell 106 secured at one end 106A to the support means which comprises a support cradle 108 in the illustrated embodiment, and to a scale load receiving subplatter 110 at its opposite end 106B. The subplatter 110 is located below the upper surface 102A of the checkout counter 102 as best shown in FIGS. 3 and 4.

Optical scanning means comprising a self-contained optical scanner 112 is rested upon the subplatter 110 for reading coded labels, such as bar-coded labels, on products presented for purchase at the checkout counter 102. The optical scanner 112 has an upper surface 112A including an optical scanning window 112B through which scanning light beams pass. The optical scanning window 112B is flush with the remainder of the upper surface 112A such that the window 112B and upper surface 112A are easy to clean. The remainder of the upper surface 112A defines a weighing area adjacent to the window 112B which receives the majority of items to be weighed such that debris from those items will not fall on the window 112B tending to keep it clean.

The optical scanner 112 is preferably vertically positioned such that its upper surface 112A is substantially aligned with the upper surface 102A of the checkout counter 102 when the optical scanner 112 is rested upon the scale subplatter 110. The weight of the optical scanner 112 and associated cabling is, like that of the subplatter 110, compensated by, for example, being zeroed out in establishing the scale zero reading during calibration. Thus, the upper surface 112A of the optical scanner 112 serves as the scale weighing platter for receiving products to be weighed and only the product weights are included in the weight readings.

The scale subplatter 110 and scanner 112 include scanner locator means comprising two raised circular bosses 110A on the subplatter 110 which are received by corresponding indentations (not shown) formed into the bottom of the optical scanner 112 in the embodiment illustrated in FIGS. 1–8. The scanner locator means provide for positioning and horizontally stabilizing the optical scanner 112 on the subplatter 110 for assembly and operation of the data gathering system 100. Alternately, bosses or pins could be formed on the scanner 112 with matching indentations or holes on the subplatter 110, or combinations of bosses and matching indentations or holes could be formed on both the scanner 112 and the subplatter 110. Of course, differently shaped bosses or different locating means can be provided as will be apparent to those skilled in the art.

The data gathering system 100 may be positioned within the checkout counter 102 such that the upper surface 112A of the optical scanner 112 is slightly above the upper surface 102A of the counter 102 as best shown in FIGS. 1 and 5. This positioning of the data gathering system 100 within the counter 102 combined with a tapered trim strip 114 defines a downwardly stepped path illustrated by the arrow 116 shown in FIG. 5 for products to be processed by the system. The tapered trim strip 114 is secured across the checkout counter 102 adjacent the entry side 100A of the data gathering system 100 to slightly elevate the upper surface 102A of the counter 102 above the upper surface 112A of the system.

The trim strip 114 is shown as having exaggerated thickness in FIG. 5; however, it can be quite thin, as thin as 0.040–0.080 inch depending upon the stiffness of the scale 104 and yet provide smooth passage of products across the data gathering system 100. The downwardly stepped path for products processed by the system is important since the smooth upper surface 112A of the scanner 112 permits products to be slid thereacross by a sales clerk using the data gathering system 100. If a downwardly stepped path is not provided, products may catch at the entry side 100A and potentially at the exit side 100B of the system inconveniencing the sales clerk and substantially reducing this attractive feature of the system.

The support means in the form of support cradle 108 is adapted to be hung from the checkout counter 102 by means of support flanges 108A which extend from end plates 108B of the support cradle 108. The end plates 108B are separated from one another by a distance which is preferably substantially equal to the length of the scanner 112 plus ¼ inch such that with the scanner 112 centered therebetween, a ⅛ inch air gap is maintained at each end of the scanner. Similar sizing/spacing is defined at the entry and exit sides 100A, 100B of the system, see FIGS. 2 and 3.

Such spacing is important since the upper surface of the system defining the scale platter must be free to deflect vertically without contact with the counter to ensure accurate weights. In the prior art, problems have been encountered due to irregularities or insufficient length or width of the counter openings which can result in improper installation and incorrect weights. Problems can also be created due to lateral movement of the scale caused by placing or sliding products over the scale platter. Such problems are substantially eliminated by the present system. It should be apparent that the counter 102 can be adapted to support the data gathering system 100 from the support flanges 108A such that the system can be precisely located relative to the counter 102 with convenient adjustment, if necessary, being provided by shims or otherwise. The data gathering system 100 may be maintained in position by inter-engagement of the support flanges 108A with the counter 102 or a variety of fastener devices can be employed if desired as will be apparent to those skilled in the art.

Figure 2:
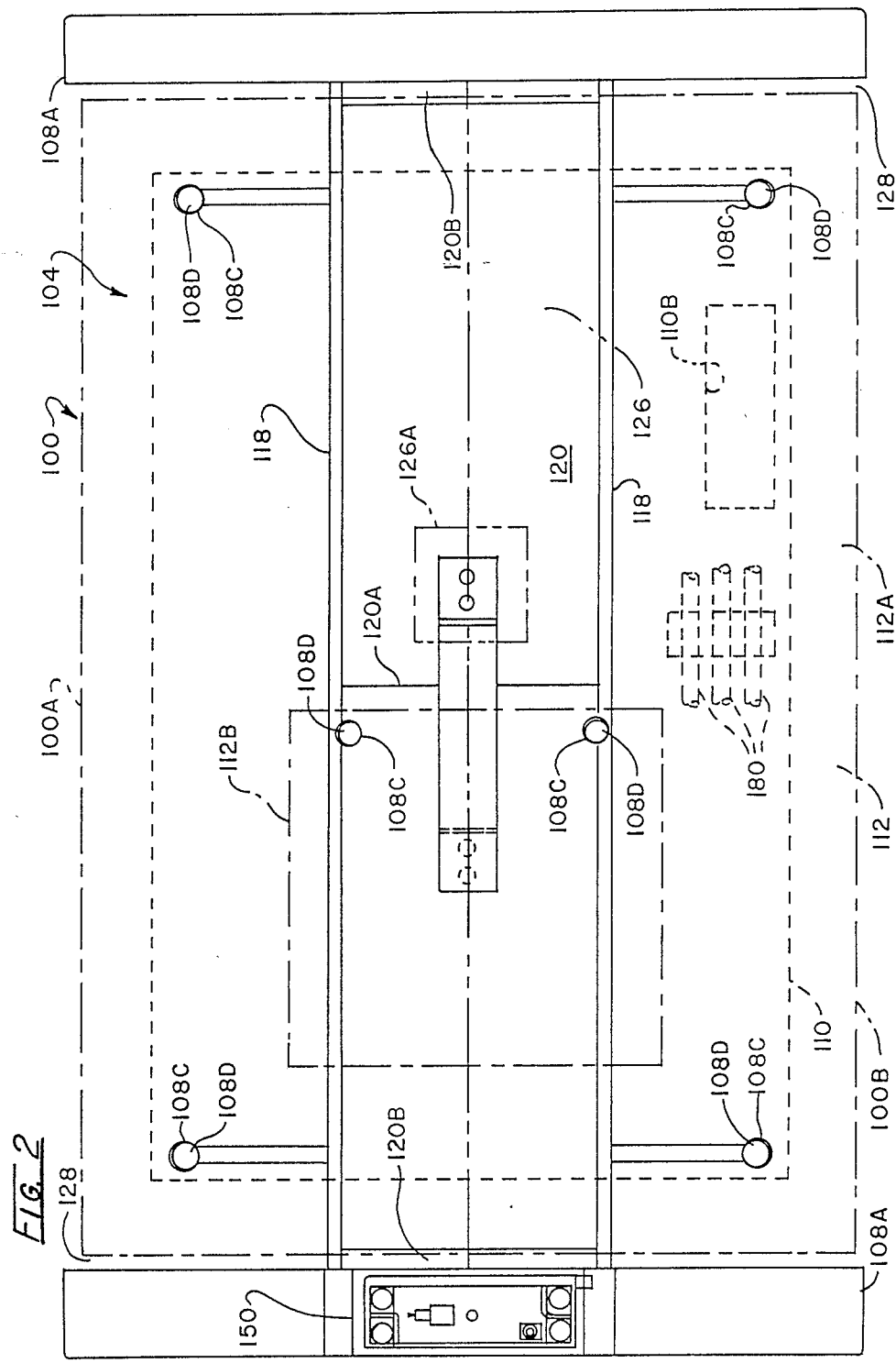

The support cradle 108 comprises at least two scale subplatter stop members 108C, six stop members 108C being included in the first illustrated embodiment as best shown in FIGS. 1 and 2, positioned to engage the subplatter 110 at the maximum allowable extent of its travel to thereby prevent potentially damaging overloading of the load cell 106. Preferably, stop pads 108D made of metal such as hardened steel are formed at the upper surfaces of the stop members 108C as shown in FIGS. 2–4.

The support cradle 108 comprises generally vertical side walls 118 and a bottom wall 120 which define a channel 122 extending laterally across the checkout counter 102 for receiving and protecting the load cell 106 and electrical circuitry (not shown) which is connected to and operable with downwardly toward the end plates 108B of the support cradle 108 adjacent which the bottom wall 120 terminates in open slots 120B. A crowned channel cover 126, shown in FIGS. 1-4, includes an opening 126A through which the load cell 106 is connected to the scale subplatter 110, see FIG. 2.

This support arrangement or mounting for the data gathering system 100 provides improved spill control over the prior art. In particular, any spilled liquids which flow over the entry side 100A or exit side 100B of the system will flow harmlessly down the sides of the optical scanner 112 to the floor beneath the system where it can be periodically or immediately attended to through access panels (not shown) in the counter 102. Spilled liquids which flow down the ends of the system are limited to some extent by the narrow slots 128 between the optical scanner 112 and the support flanges 108A end plates 108B of the support cradle 108, see FIGS. 2 and 3. Further, the majority of such liquid will also flow harmlessly to the floor beneath the system due to the narrowness of the width of the channel 122 which is approximately one third of the width of the data gathering system 100. The remaining small portion of spilled liquid which passes through the narrow slots 128 will initially engage the crowned channel cover 126 and be diverted to the sides of the channel 122 and once again to the floor beneath the system.

Any spilled liquid which does manage to seep past the channel cover 126 will flow down the interior surfaces of the end plates 108B and/or be diverted by the tapered bottom wall 120 to pass to the floor beneath the system through the slots 120B. Spilled liquids are thus eliminated from the data gathering system 100 by paths which do not tend to interfere with the movement and hence the operation of the scale 104 of the system. While liquids, particularly thick liquids, may tend to accumulate on the optical scanner walls and change the zero setting of the scale 104, this creates no problem since the scale 104 can be automatically or manually zeroed without removal of the system 100 from the counter 102 as will now be described.

The data gathering system 100 includes scale adjusting means comprising a scale calibrating/zeroing system 148 which is integrated into one of the support flanges 108A. The calibrating/zeroing system 148 is enclosed in a housing 150 as generally shown in FIGS. 1-4 and best shown in FIGS. 6-8 wherein various elements of the system are not shown in all the drawing figures for ease of description and illustration. The housing 150 is covered by a hingedly mounted door 152 including a window 156 through which a light source such as a light emitting diode (LED) 158 visibly signals a sales clerk using the data gathering system 100 or other personnel servicing the system. Housing closures such as snap fitting latches and the like may be provided to close door 152 or simply the weight of the door may hold it closed.

Figure 6:
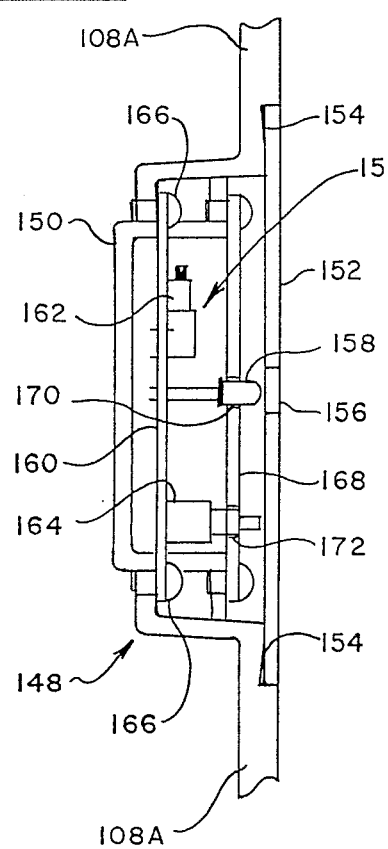
FIGS. 6-8 illustrate a calibration and zeroing arrangement for the scale of the data gathering system.
Figure 7:
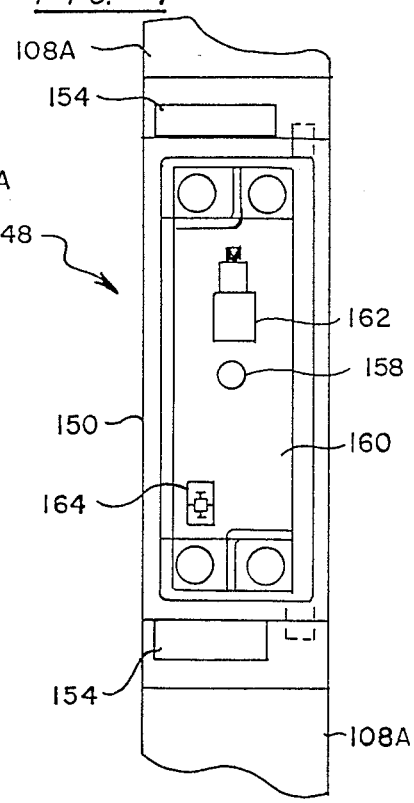
Figure 8:
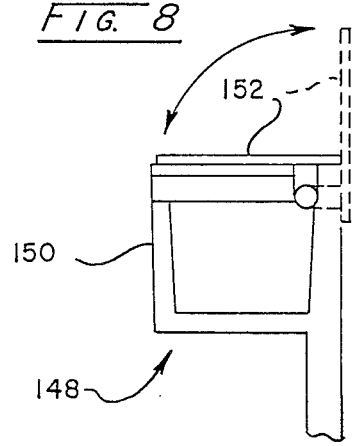

Mounted within a chamber 150A, see FIG. 6, of the housing 150 is a circuit board 160 to which is mounted a scale calibration switch 162, the LED 158 and a scale zeroing switch 164. The circuit board 160 is secured within the chamber 150A of the housing 150 by screws 166 or other appropriate fastening devices. A cover panel 168, see FIG. 6, is secured and preferably sealed in the upper part of the housing 150 to form an upper wall of the chamber 150A. The cover panel 168 includes apertures 170 and 172 through which the LED 158 and the zeroing switch 164 protrude, respectively. A lighted switch could be used, if desired, to replace the LED 158 and the zeroing switch 164 for a potentially simplified user interface. In any event, the panel 168 thus permits access to the zeroing switch 164 if the door 152 is opened by a sales clerk or other authorized person to permit convenient zeroing or rezeroing of the scale 104; however, the panel 168 prevents access to the calibration switch 162 which should only be operated by service personnel on a periodic basis. After calibration, the panel 168 would be sealed in accordance with requirements of local weights and measures.

In accordance with the calibrating/zeroing system 148 of the data gathering system 100, if the scale 104 indicates a weight other than zero when nothing is present on the upper surface 112A of the optical scanner 112, the operator can zero the scale 104 by activating the scale zeroing switch 164 after opening the door 152. Zero offsets may be caused, for example, by the accumulation of debris on the optical-scanner/weighing-platter combination. Also, to ensure accurate weighing operations, the scale 104 is periodically calibrated or recalibrated by authorized service personnel. However, in this system, as opposed to the prior art, the service person merely has to open the door 152, remove the weights and measures seal and the cover panel 168, and depress the calibration switch 162 to initiate the calibration operation.

Accordingly, the data gathering system 100 does not have to be removed from the counter 102 for such standard maintenance operations. The LED 158 is used to signal the operator that service is required and to assist in performing the service which is required. For example, the LED 158 may be lighted to advise the operator that the scale 104 is zeroed and extinguished if the scale drifts out of zero. For calibration, the lighting of the LED 158 can be controlled to advise the service person that steps of a calibration operation have been properly performed.

As an example of a calibration routine for a scale having a 30 pound (15 kg) capacity, a precision weight of 20 pounds (10 kg) and zero weight may be used. Initially, the calibration switch 162 is depressed to start the calibration routine. The LED 158 will begin to blink indicating the calibrate mode. A service person insures that no weight is on the optical-scanner/weighing-platter and then depresses the zeroing switch 164. Once this step is successfully completed, the LED 158 is lighted for approximately 5 seconds and then begins blinking again to signal the service person to place the 20 pound (10 kg) weight on the center of the optical-scanner/-weighing-platter and press the zeroing switch 164. The LED 158 will then extinguish for approximately 5 seconds and then light steadily when calibration is completed. From these two known data points, the scale 104 can generate accurate weight signals for products placed on the upper surface 112A of the optical scanner.

To prevent interference with operation of the scale 104, cables for conducting electrical signals and power between the optical scanner 112 and the scale 104 of the data gathering system 100 are formed and secured to the scale 104 during its manufacture. More particularly, cables 180 extend between and are secured to the scale subplatter 110 and one of the side walls 118 of the channel 122 such that the cables 180 permit free deflection of the load cell 106. See FIGS. 1-3. By securing the cables 180 to subplatter 110 and one of the side walls 118, the cables 180 define a spring having a constant spring rate so that the weight and spring rate of the cables 180 can be compensated during calibration of the scale 104. This cabling arrangement is important since cables to the optical scanner 112 must be routed through the scale subplatter 110 via an opening 110B therethrough. The cables 180 are then routed up to a vestibule 112C on the scanner 112 and connected to the appropriate connectors therein. The cables 180 include sufficient slack between subplatter 110 and scanner 112 to permit quick and easy installation and removal of the scanner 112.

Figure 9:
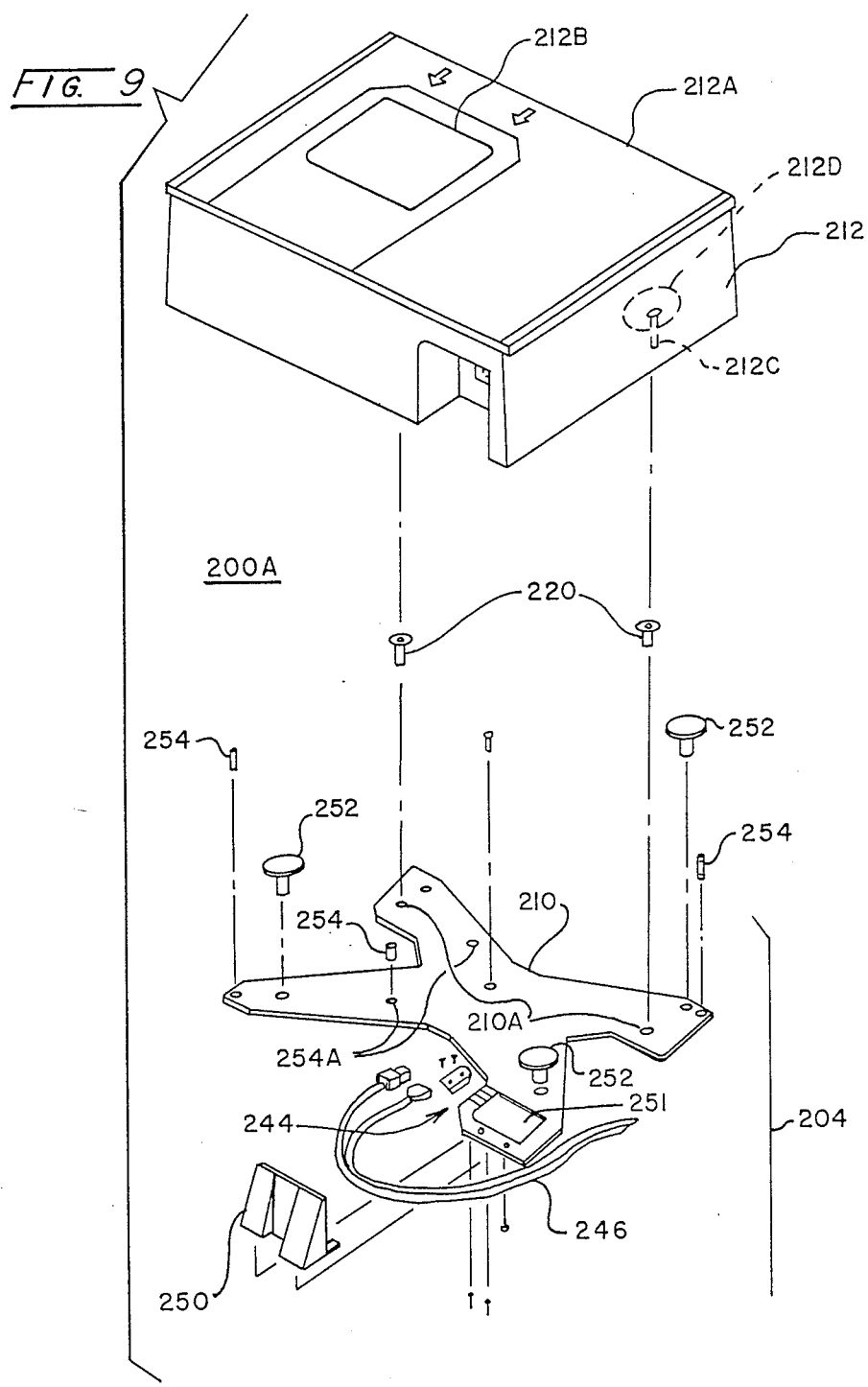
FIGS. 9 and 10 form an exploded perspective view of a preferred form of data gathering system embodying the present invention when
Figure 10:
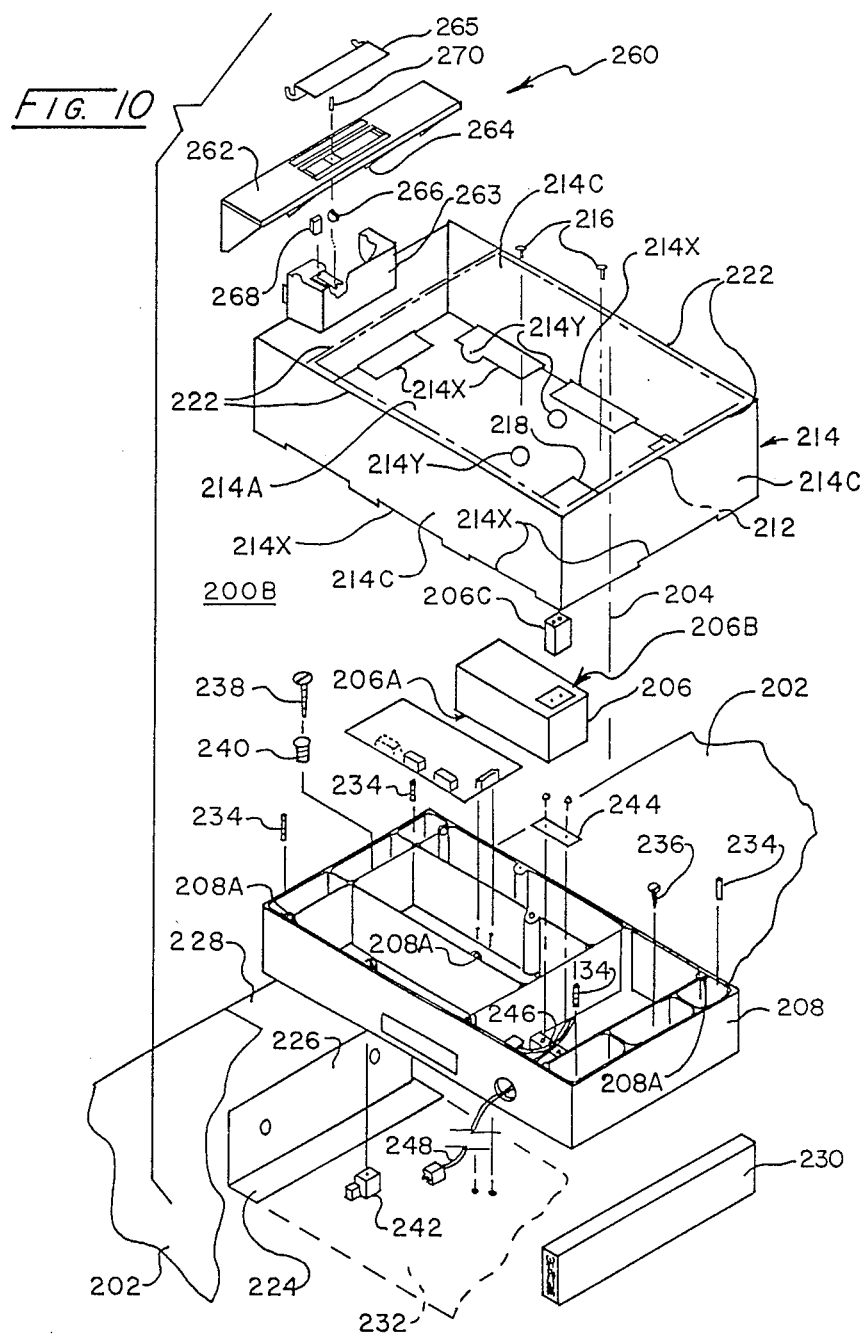

FIGS. 9 and 10 illustrate an alternate form of a data gathering system 200 which does not utilize a support cradle but includes a perimeter enclosure which facilitates proper spacing and mounting of the system within a checkout counter. The data gathering system 200 comprises a weighing scale 204 supported within the checkout counter 202 by base means comprising a scale base casting 208. The weighing scale 204 comprises a load cell 206 secured at one end 206A to the base casting 208 and to a scale load receiving plate, or subplatter 210 at its opposite end 206B. The subplatter 210 is formed as a spider to facilitate access to the base casting 208 prior to installation or after removal of a self-contained optical scanner 212 which is rested upon the subplatter 210.

Perimeter enclosure means comprising a generally open-top rectangular housing 214 having a floor 214A and sidewalls 214C is secured to the base casting 208 for example by screws 216 or other appropriate fasteners. The perimeter enclosure means houses the subplatter 210 and the optical scanner 212 which rests upon the subplatter 210. The vertical position of the optical scanner 212 is such that the scale weighing platter defined by the upper surface of the scanner is at a desired height with respect to the upper surface of the checkout counter 202, preferably substantially aligned therewith. The scale subplatter 210 is supported upon an extension 206C of the load cell 206 Which protrudes through an aperture 218 in the floor 214A of the housing 214. The weight of the optical scanner 212 and associated cabling is eliminated from weight readings when the zero point of the scale is defined during calibration so that only the weight of products placed on the upper surface 212A or window 212B of the optical scanner 212 is indicated.

The scale subplatter 210 and scanner 212 include scanner locator means comprising two raised circular bosses or pins 212C formed into the bottom 212D of the optical scanner 212 which are received by corresponding indentations or holes 210A on the subplatter 210. As before, the scanner locator means proVide for positioning and horizontally stabilizing the optical scanner 212 on the scale subplatter 210 for assembly and operation of the data gathering system 200.

The illustrated locator means further comprises scanner locating grommets 220 sized to be received into the holes 210A and, in turn, to receive the pins 212C therein to facilitate positioning of the end stably positioning the optical scanner 212 therewithin by means of the locator means the clearance gaps 222 are maintained during normal operation of the system and checkout counter manufacturers and installers are able to use materials and tools which are currently used to install systems having only an optical scanner to install the data gathering system 200. The maintenance of adequate clearance gaps is important since the scanner serving as the scale platter must be free to deflect vertically without contact with the counter 202 to ensure accurate weights.

The base casting 208 is supported within the checkout counter 202 by placement upon metal flanges 224 defined by angle brackets 226 which are secured to sidewalls 228 of the checkout counter 202 when the checkout counter 202 is constructed of metal. Alternately, if the checkout counter 202 is constructed of wood, the base casting 208 is supported upon wooden support braces 230 which are also secured to the sidewalls 228 of the checkout counter 202. For either metal or wooden checkout counters, the base casting 208 ca also be supported upon a deck 232 which is supported between the sidewalls 228 of the checkout counter 202. In any event, the base casting 208 preferably comprises adjusting means comprising leveling screws 234 threadedly engaging the base casting 208 for leveling the base casting 208. The base casting 208 is secured to the checkout counter 202 by wood screws 236 through slots (not shown) in the base casting 208 or attaching hardware comprising a screw 238, compression spring 240 and a rotatable securing nut 242, either of which can be initially secured yet permit sliding motion of the system 200 for final positioning prior to fully securing the system 200 into the checkout counter 202. Of course, other hardware such as sheet metal screws or the like could also be used to secure the system 200 within the checkout counter 202 as should be apparent.

Figure 11:
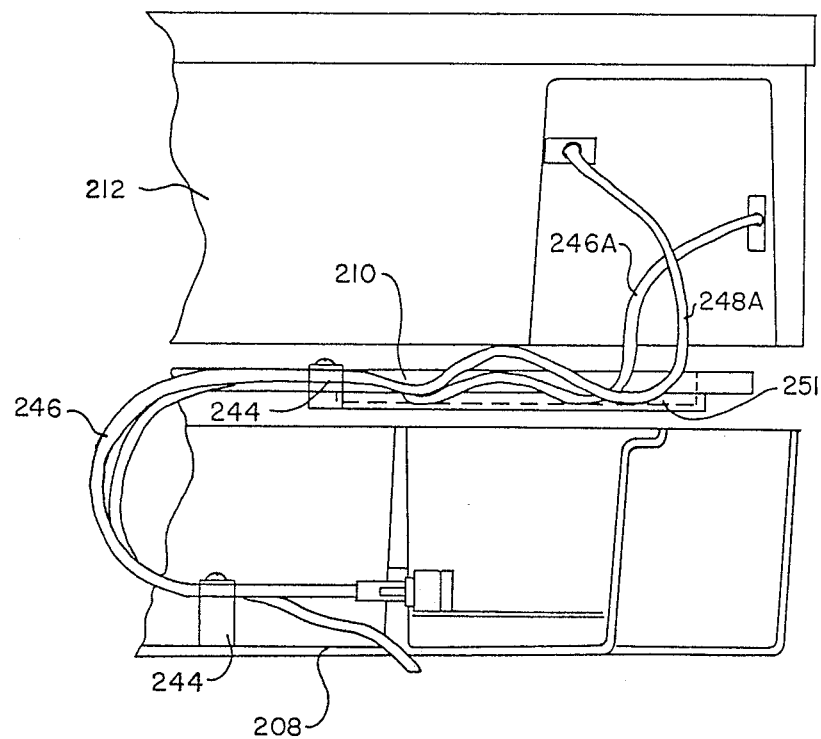
FIG. 11 is a partial side elevational view of the data qathering system of FIGS. 9 and 10 assembled showing the cable routing.
Figure 12:
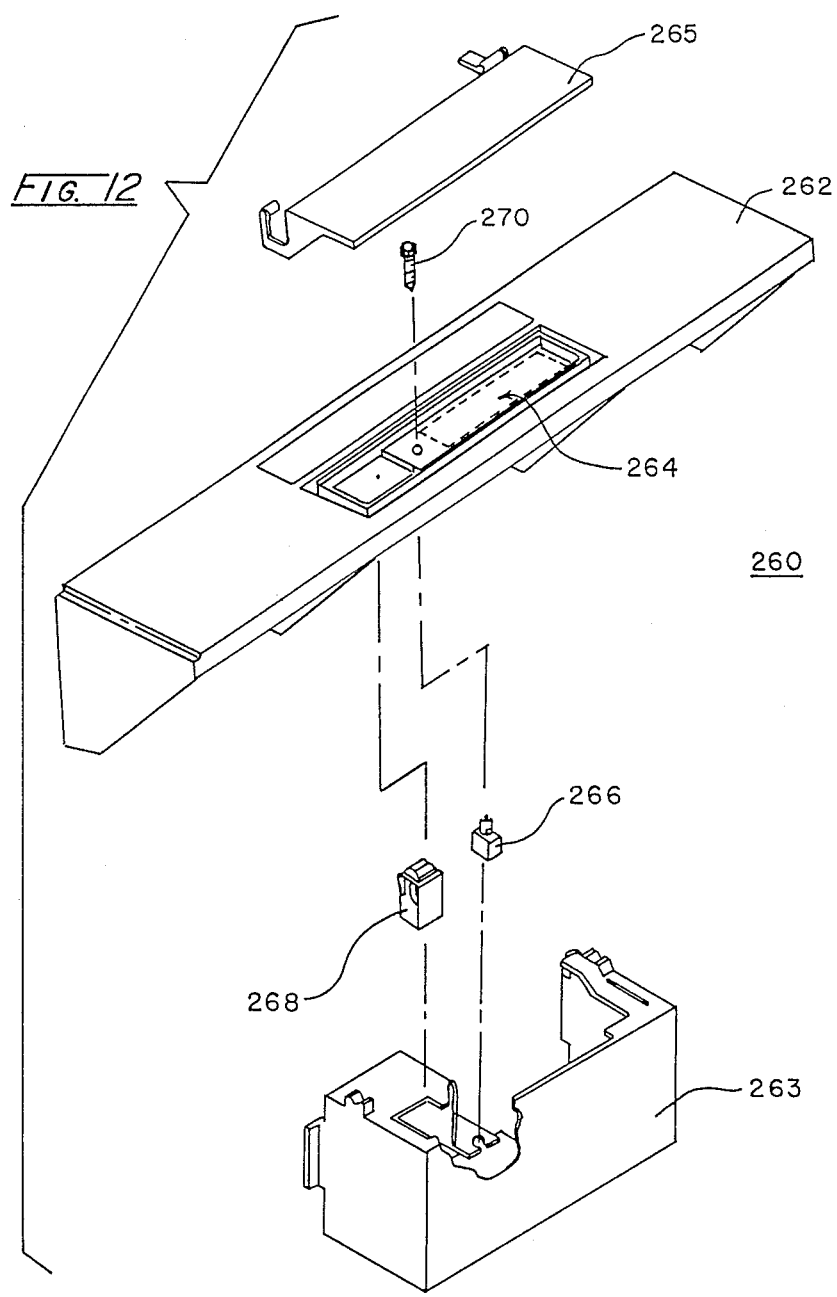
FIG. 12 is an exploded view to a larger scale of the calibration/zeroing arrangement shown in FIG. 10.

Preferably, strain relief means comprising cable clamping plates 244 can be used to secure cables 246 which connect electrical signals and power from a power cord 248 between the weighing scale 204 and the optical scanner 212. As shown in FIG. 11, cables 246 and 248 when secured to subplatter 210 and base casting 208 by clamping plates 244 form a spring between the two clamping plates 244 having a substantially constant spring rate. The weight of the cables 246 and the spring rate affect the weighing results of the scale 204 but are substantially constant when the cables 246 are so secured and can be compensated during calibration. Cable guide means comprising a cable guide 250, see FIG. 9, is provided to facilitate routing the portion 246A of the cables 246 above subplatter 210. Hence, installation and maintenance of the data gathering system 200 is facilitated. While the cable guide means can take a variety of forms, in the illustrated embodiment the cable guide 250 is shown as being generally L-shaped and secured to the scale subplatter 210. A recess 251 is formed in subplatter 210 to provide substantial clearance for cable portion 246A between subplatter 210 and scanner 212 as shown in FIGS. 9 and 11.

Figure 13:
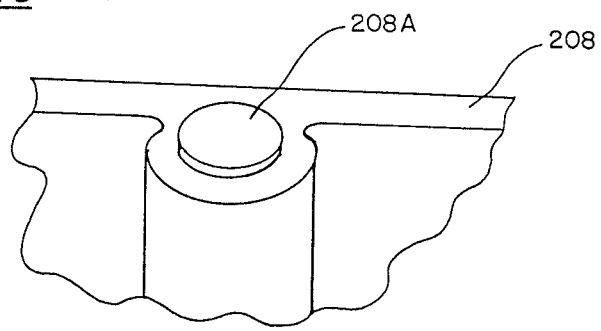
FIG. 13 shows an abutment portion of a base casting of the system of FIGS. 9 and 10.
Figure 14:
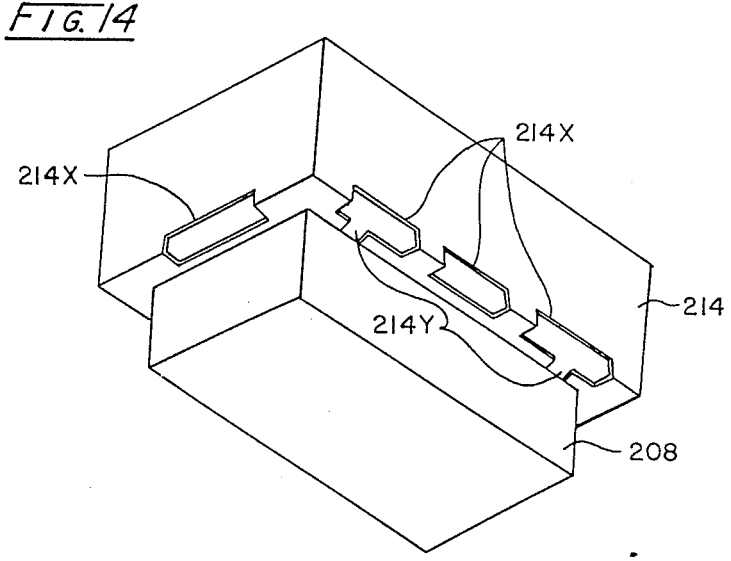
FIG. 14 is a bottom perspective view of the system to illustrate a spilled liquid control feature of the present invention.

Scanner height adjustments and overload stop settings of the scale 204 are preferably performed by the present invention by means of apparatus incorporated into the scale subplatter 210. Height adjustments means comprising height adjustment bumpers 252 threadedly engaging the four corners of the subplatter 210 provide for selectively adjusting the height of the optical scanner 212 to a limited extent relative to the scale subplatter 210 and accordingly the checkout counter 202. Overload stop adjustment means comprising adjustment screws 254 threadedly engaging the four corners of the subplatter 210 and two more central locations 254A and aligned with portions of the base casting 208, defined by buttons 208A shown in FIGS. 13 and 14, provide for selectively adjusting the maximum vertical deflection of the scale subplatter 210 to thereby prevent potentially damaging overloads on load cell 206. It should be apparent that the exact positioning of the height adjustment means and the overload stop adjustment means are not critical to the present invention such that differing numbers of elements and differing positioning could be used in accordance with the present invention.

The perimeter enclosure means or housing 214 preferably includes spill control means for diverting liquids spilled on the system away from the base casting 208 such that these liquids do not damage or affect the operation of the system 200. As shown in FIG. 14, the spill control means comprise forming the housing 214 such that it extends over the base casting 208 in all directions and includes openings 214X around the outer edges of the housing 214. The buttons 208A are accommodated by openings 214Y such that the housing 214 rests flush upon the base casting 208 to thereby help prevent liquids from entering the base casting 208. The outer edges of the housing 214 may be deformed downwardly to further assist in spill control in the present invention.

The data gathering system 200 includes scale adjusting means comprising a scale calibrating/zeroing system 260 which is integrated into one end of the housing 214. The calibrating/zeroing system 260 is incorporated into a panel 262 which is fastened into one end of the housing 214 and a support enclosure 263 which connects to the panel 262. An opening 264 in the panel 262 is covered by a transparent window (not shown) which can be inserted into the opening 264 or can take the form of a door 265 which is hingedly mounted to the panel 262. A scale calibration switch 266 and a lighted scale zeroing switch 268 are mounted to the support enclosure 263 within the opening 264. A screw 270 is threadedly mounted in the opening 264 over the scale calibration switch 266. The screw 270 can thus be sealed either by a lead wire and seal or paper seal in accordance with local weights and measures requirements to preclude access to the calibration switch 266 by other than authorized personnel. Operation of the calibrating-/zeroing system is as described above in connection with FIGS. 1 to 8.

Having thus described the data gathering system of the present invention in detail and by reference to preferred embodiments thereof, it will be apparent that modifications and variations are possible without departing from the scope of the invention defined in the appended claims.

What is claimed is:

1. A data gathering system to be inserted into a checkout counter and including a weighing scale and an optical scanner supported thereon and defining an upper weighing surface of said scale, said data gathering system including mounting apparatus comprising:

base means secured within said checkout counter for supporting said data gathering system, said scale being secured to said base means;

perimeter enclosure means secured to said base means for housing said optical scanner, said perimeter enclosure means substantially surrounding said optical scanner and defining a selected size opening for receiving said optical scanner generally centered therein, said scale including a load receiving plate supported upon an extension protruding through an aperture in a floor of said perimeter enclosure means; and locator means for stably positioning said optical scanner on said scale weighing platter, said optical scanner being positioned by said locator means and sized relative to said perimeter enclosure means such that clearance gaps required for proper operation of said weighing scale are defined between said optical scanner and said perimeter enclosure means.

2. A data gathering system as claimed in claim 1 wherein said base means comprises integral adjusting means for leveling said base means.

3. A data gathering system as claimed in claim 2 wherein said checkout counter includes sidewalls and said base means is supported upon and secured to inward extension means projecting from said sidewalls and said integral adjusting means comprises leveling screws threadedly engaging said base means.

4. A data gathering system as claimed in claim 1 wherein said base means and said scale load receiving plate comprise strain relief means for securing cables which connect electrical signals and power between said weighing scale and said optical scanner.

5. A data gathering system as claimed in claim 4 wherein said scale load receiving plate further comprises cable guide means for routing said cables between said weighing scale and said optical scanner to facilitate installation and maintenance of said data gathering system.

6. A data gathering system as claimed in claim 1 wherein said load receiving plate comprises height adjustment means for selectively adjusting the height of said optical scanner relative to said load receiving plate/checkout counter.

7. A data gathering system as claimed in claim 6 wherein said height adjustment means comprises height adjustment bumpers threadedly engaging said load receiving plate for supporting said optical scanner thereon.

8. A data gathering system as claimed in claim 7 wherein said locator means comprises at least two pins which are received in corresponding holes, said pins and holes being formed on the bottom of said optical scanner and said load receiving plate.

9. A data gathering system as claimed in claim 8 wherein said locator means further comprises scanner locating grommets sized to be received into said holes and in turn to receive said pins to thereby facilitate height adjustment of said optical scanner.

10. A data gathering system as claimed in claim 1 wherein said scale load receiving plate comprises overload adjustment means for selectively adjusting the maximum travel of said load receiving plate to thereby prevent potentially damaging overload.

11. A data gathering system as claimed in claim 10 wherein said overload adjustment means comprises overload adjustment screws threadedly engaging said load receiving plate, said overload adjustment screws being aligned with portions of said base means to define limits of travel for said load receiving plate.

12. A data gathering system as claimed in claim 1 wherein said load receiving plate is formed as a spider to facilitate access to said base means prior to installation or after removal of said optical scanner from said data gathering system.

13. A data gathering system as claimed in claim 1 further comprising fastener means associated with said base means for securing said system into said checkout counter.

14. A data gathering system as claimed in claim 13 wherein said checkout counter includes sidewalls and said base means is supported upon and secured to inward extension means projecting from said sidewalls, said fastener means comprising clamping means for partially securing said system for initial positioning and for fully securing said system after it is positioned.

15. A data gathering system as claimed in claim 1 wherein said perimeter enclosure means comprises spill control means for diverting liquids spilled on said system away from said base means.

16. A data gathering system as claimed in claim 15 wherein said perimeter enclosure means extends over at least one side of said base means and said spill control means comprises at least one opening in said perimeter enclosure means positioned to extend over said at least one side of said base means to divert liquids spilled on said system therethrough.

* * * * *